US011945550B2

(12) United States Patent
Paquet et al.

(10) Patent No.: US 11,945,550 B2
(45) Date of Patent: Apr. 2, 2024

(54) DEVICE FOR THE TRANSFER OF CRYOGENIC PRODUCTS BETWEEN A FLOATING STRUCTURE AND A FIXED OR FLOATING STRUCTURE

(71) Applicant: FMC Technologies, Sens (FR)

(72) Inventors: Stéphane Paquet, Septeuil (FR); Renaud Le Devehat, Saligny (FR)

(73) Assignee: T.EN LOADING SYSTEMS, Sens (FR)

( * ) Notice: Subject to any disclaimer, the term of this patent is extended or adjusted under 35 U.S.C. 154(b) by 927 days.

(21) Appl. No.: 16/766,679

(22) PCT Filed: Nov. 23, 2018

(86) PCT No.: PCT/EP2018/082367
§ 371 (c)(1),
(2) Date: May 23, 2020

(87) PCT Pub. No.: WO2019/101922
PCT Pub. Date: May 31, 2019

(65) Prior Publication Data
US 2020/0362991 A1    Nov. 19, 2020

(51) Int. Cl.
*B63B 27/24* (2006.01)
*B63B 22/02* (2006.01)
(Continued)

(52) U.S. Cl.
CPC ............ *B63B 27/24* (2013.01); *B63B 22/021* (2013.01); *B63B 27/34* (2013.01); *F16L 1/24* (2013.01);
(Continued)

(58) Field of Classification Search
CPC ......... B63B 27/00; B63B 27/24; B63B 27/34; B63B 22/00; B63B 22/021; F16L 1/00;
(Continued)

(56) References Cited

U.S. PATENT DOCUMENTS 6,719,008 B1    4/2004  Le Devehat

FOREIGN PATENT DOCUMENTS

FR         80801 E       6/1963
GB         1371351       10/1974
(Continued)

OTHER PUBLICATIONS

China National Intellectual Property Administration, Notification of Second Office Action dated Jul. 12, 2022 (issued in connection with Chinese Patent Application No. 201880083481.3).
(Continued)

*Primary Examiner* — Lars A Olson
(74) *Attorney, Agent, or Firm* — Locke Lord LLP; Gabrielle L. Gelozin

(57) ABSTRACT

The present invention concerns a device for the transfer of cryogenic product from a first floating structure (330) for storing cryogenic product to a second fixed or floating structure for storing cryogenic product, comprising pipes (100) configured to transport the cryogenic product between a duct (300) linked to the first structure and a duct (200) linked to the second structure. Said pipes (100) are rigid, carried by buoyancy means (400) and fluidically connected in pairs by connection means (600) suitable for transporting the cryogenic product and allowing at least one degree of freedom. The present invention also concerns a method for retracting a device for the transport of cryogenic product.

13 Claims, 5 Drawing Sheets

(51) Int. Cl.
*B63B 27/34* (2006.01)
*F16L 1/24* (2006.01)
*F17C 7/02* (2006.01)

(52) U.S. Cl.
CPC ........ *F17C 7/02* (2013.01); *F17C 2205/0352* (2013.01); *F17C 2205/037* (2013.01); *F17C 2221/033* (2013.01); *F17C 2223/0161* (2013.01); *F17C 2270/0102* (2013.01); *F17C 2270/0126* (2013.01)

(58) Field of Classification Search
CPC ...... F16L 1/24; F17C 7/00; F17C 7/02; F17C 2205/0352; F17C 2223/0161; F17C 2270/0102; F17C 2270/0126
USPC ................................ 441/133, 3, 4; 137/615
See application file for complete search history.

(56) References Cited

FOREIGN PATENT DOCUMENTS

| | | |
|---|---:|---|
| GB | 1393369 A | 5/1975 |
| GB | 2058282 A | 4/1981 |
| JP | 56-130060 U | 2/1980 |
| KR | 2020120004664 U | 6/2012 |
| KR | 101713848 B1 | 3/2017 |
| WO | WO 2015/107147 A1 | 7/2015 |

OTHER PUBLICATIONS

Japan Patent Office, Notice of Reasons for Rejection dated Jun. 28, 2022 (issued in connection with Japanese Patent Application No. 2020-528254).

DEVICE FOR THE TRANSFER OF CRYOGENIC PRODUCTS BETWEEN A FLOATING STRUCTURE AND A FIXED OR FLOATING STRUCTURE

BACKGROUND OF THE INVENTION

The invention relates to a device for the transfer of cryogenic products between a first floating structure for storing cryogenic product, such as a methane tanker, and a second fixed or floating structure such as a quay or a methane tanker converted into a receiving terminal, of FSRU type (FSRU standing for Floating Storage and Regasification Unit) for storing cryogenic products. The cryogenic product may, non-limitingly, be liquefied gas, such as liquid ethane, liquefied natural gas (referred to below as "LNG") or liquid ethylene.

In order to be able to dispense with conventional jetties and bridges used to perform a transfer of a cryogenic product between for example a methane tanker and land but which prove to be very costly and to be major in its implementation, it is envisioned to perform this transfer by means of rigid cryogenic pipes with a double envelope laid on the sea bed or by means of floating flexible cryogenic pipes.

The first alternative solution is nevertheless highly constraining, in particular with regard to manufacture and installation of the cryogenic line, while the second solution has high pressure losses due to the roughness of the internal wall of the flexible pipes.

SUMMARY OF THE INVENTION

The present invention is directed to providing a device for the transfer of cryogenic product from a first floating structure for storing cryogenic product to a second fixed or floating structure for storing cryogenic product not having the drawbacks mentioned above and furthermore leading to other advantages.

To that end, according to a first aspect, the present invention concerns a device for the transfer of cryogenic product from a first floating structure for storing cryogenic product to a second fixed or floating structure for storing cryogenic product, comprising pipes configured to transport the cryogenic product between a duct linked to the first structure and a duct linked to the second structure, said device being characterized in that said pipes are rigid, carried by buoyancy means and fluidically connected in pairs by connection means suitable for transporting the cryogenic product and allowing at least one degree of freedom.

Such a solution has numerous advantages and in particular those of fast implementation, of employment of piping that is particularly configured for the transfer of a cryogenic product and of great flexibility, in particular due to the possibility of fast relocation.

In practice, when a single degree of freedom is provided, this is preferably with a substantially horizontal axis rotation of one pipe relative to another.

Preference will however be given to at least two degrees of freedom, in which case these are preferably two rotations of axes which are perpendicular to each other.

These latter provisions make it possible to better accommodate both the movements of the waves and of the first floating structure.

According to other possible features, taken in isolation or in combination one with another:

the buoyancy means comprise floats linked or articulated to each other or buoys provided with means for anchorage to the bed of an expanse of water;

the buoyancy means are linked to the pipes by means of an articulation;

the buoyancy means are articulated to the pipes along a vertical axis;

each buoyancy means comprises a pipe support enabling pipe sliding and/or comprises a support for pipe fastening to the buoyancy means;

the buoyancy means number one per pipe, and are arranged parallel thereto, or two per pipe, and are arranged perpendicularly thereto;

at least one of the connection means comprises between two ends of two successive pipes, an assembly formed from at least three cryogenic swivel joints and tube elbows connecting them so as to connect the pipes with at least three degrees of rotary freedom;

the number of cryogenic swivel joints is six to reproduce the six degrees of freedom;

at least one of the connection means is a flexible pipe configured to cooperate with a free end of a first rigid pipe and a free end of a second rigid pipe, and in that said flexible pipe is configured to transport a cryogenic product;

it is configured to be linked to the second structure by mechanical linking means, said mechanical linking means comprising one or more levers articulated to the device and to the second structure by means of pivot links or a sliding link;

the device comprises a flexible pipe configured to transport the cryogenic product and to provide the link between an endmost rigid pipe and the duct linked to the second structure.

the device is configured to be linked to the duct of the second structure by mechanical linking means and fluidic linking means;

the device comprises a cryogenic interface comprising cryogenic piping configured to provide the fluidic link between an endmost pipe and a first structure target duct situated at a higher level;

the fluidic connection means and, where provided, the linking means between buoyancy means, are configured to enable a rotation through 180° around a substantially vertical rotational axis to be able to dispose the pipes and buoyancy means parallel to each other, while the buoyancy means are arranged so as not to interfere with that rotation.

According to a second aspect, the present invention concerns a method of retracting a device comprising at least three fluidic transport units each comprising a buoyancy means bearing a pipe, the method comprising the following steps of retracting at least two transport units one onto the other:

Folding through a rotation of at least 180° around a rotational axis, of a first transport unit onto a second successive transport unit;

Folding through a rotation of at least −180° around a rotational axis, of said second transport unit onto a third transport unit; and, optionally Rotation of the transport units folded onto each other so as to orientate the assembly so formed in a predetermined direction.

BRIEF DESCRIPTION OF THE DRAWINGS

Still other particularities and advantages of the invention will appear in the following description of non-limiting examples, made with reference to the accompanying drawings, in which.

DETAILED DESCRIPTION OF THE INVENTION

Figure 1:
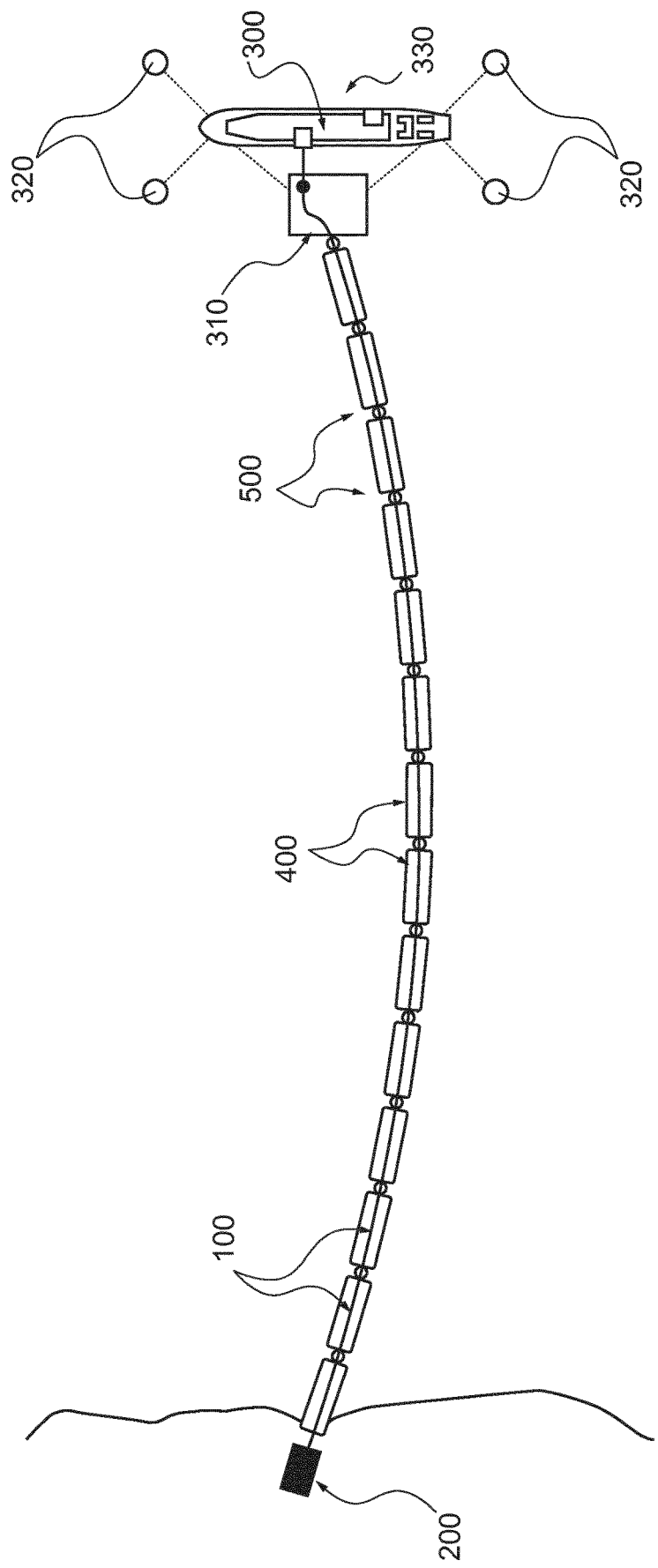
FIG. 1 is a diagrammatic representation from above of a device in accordance with an embodiment of the invention.

FIG. 1 represents a diagrammatic view from above of a transfer device, more specifically for unloading here, comprising pipes 100 linked together by connection means 500, a duct 200 here linked to a fixed structure, a duct 300 disposed on a floating structure 330, here a methane tanker, and buoyancy means 400.

The device represented here comprises 13 connection means 500, 14 buoyancy means 400 and one pipe per buoyancy means. Of course, the number of means in the device may be different.

Moreover, each pipe here has a uniform cross-section but, as a variant, this may be variable.

The duct 200, linked to a fixed structure, here a quay, links a device for storage of cryogenic product (not shown in FIG. 1) to the pipes 100.

The duct could as a variant be linked to a floating structure, such as an FSRU.

The duct 300 disposed on the floating structure 330 is linked, here, to the cryogenic product transfer device via a cryogenic interface 310 making it possible to compensate, when it proves necessary, for the difference in level between the transfer device and the location of the target duct of the methane tanker.

In practice, this interface comprises piping suitable for transporting the cryogenic product and for being linked to the pipes 100, as well as, for the linking to the duct 300 of the floating structure 330, a flexible cryogenic pipe of short length or an articulated transfer arm, of the kind known for example from patent application FR2813812. Here, this is a flexible pipe.

As a variant, such an arm is installed on the floating structure 330 to provide the linking of the latter with the interface 310.

As can still be seen in FIG. 1, the interface 310 for cryogenic product is, in practice, a floating box.

Moreover, mechanical linking means enable the cryogenic product interface 310 to be maintained substantially perpendicular relative to the longitudinal direction of the floating structure 330. These mechanical linking means are for example mooring lines belonging either to the cryogenic product interface 310, or to the floating structure 330. Thus the flank giving access to the duct of the floating structure is opposite the cryogenic product interface 310. The interface 310 can also be anchored in the ground via anchorage chains for example.

In the embodiment represented in FIG. 1, the floating structure 330 is itself moored via four fastening means 320 for example. These fastening means 320 make it possible to limit the movements of the floating structure during the transfer of cryogenic product.

They may, for example, be conventional mooring means, such as Conventional Buoy Mooring, or be Multi-Buoy Mooring. These mooring means are buoys anchored to the ground and linked to the methane tanker by a linking hawser.

The cryogenic interface 310 may also comprise motorization means suitable for enabling the cryogenic interface 310 to move so as to attain the duct 300 or, in one embodiment, to fold the device as detailed later in the description It is also possible for the cryogenic interface 310 not to comprise motorization means. In this case, the cryogenic interface is moved towards the duct 300 of the floating structure 330 by means of a tugboat, or any other vessel suitable for moving the cryogenic interface 310 towards the floating structure 330, or by means of a system of cables and winches suitable for moving the cryogenic interface 310 for the connection and the retraction.

In the embodiment represented, the pipes 100 are linked to the buoyancy means 400.

By virtue of the buoyancy means 400, the pipes 100 are here above the level of the sea here.

In another embodiment, the buoyancy means 400 may be integrated with the pipes 100.

In the embodiment shown, at least one pipe 100 is linked to a buoyancy means 400. Each pipe 100 comprises two ends and each end is linked to the directly neighboring successive pipes 100 by connection means 500.

In practice, in the embodiment of FIG. 1, there is one pipe 100 per buoyancy means 400. The pipe 100 and the buoyancy means 400 have substantially the same length.

The pipes 100 are disposed substantially parallel relative to the buoyancy means 400. In an alternative embodiment, the pipes 100 may be disposed perpendicularly relative to the buoyancy means 400, as shown in FIG. 3D described later.

Figure 2A:
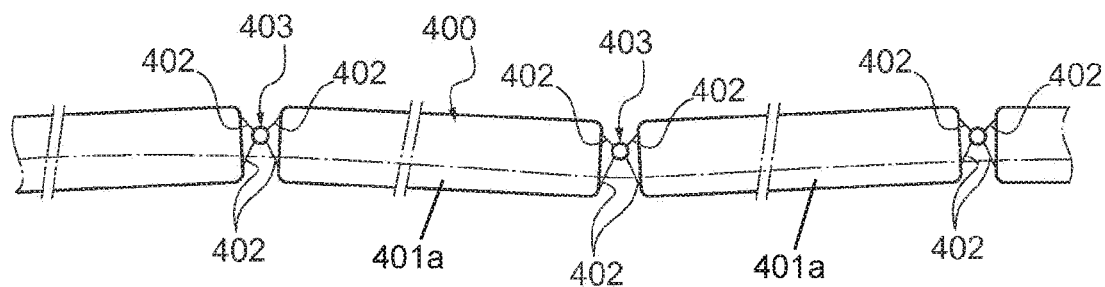
FIG. 2A is a diagrammatic representation from the side of the buoyancy means according to an embodiment of the invention.

In one embodiment, such as that represented in FIG. 2a, the buoyancy means 400 are constituted by a series of floats 401a linked together via rigid linking arms 402 enabling there to be at least one degree of freedom.

Each float 401a comprises two opposite lateral faces facing the other floats 401a having two points for fastening rigid linking arms 402. On a lateral face of a float 401a there are linked two rigid linking arms 402. These rigid linking arms 402 are linked to the two other rigid linking arms 402 of another float 401a via a ball joint link 403. This link 403 enables the floats 401a to move freely according to the movements of the sea without the link being lost.

In one embodiment, the link is reversible and may be disconnected for the transport of the floats 401a, for example.

In one embodiment, each float can comprise one, three or more rigid linking arms 402.

The length of the rigid linking arms 402 is also chosen to reduce the stresses at the fluidic connections.

Of course, the rigid linking arms 402 may have other embodiments.

In practice, such a mechanical link makes it possible in particular to pass the mechanical loads by the buoyancy means and not by the fluidic connection means, making it possible to simplify the design of these latter and to increase the lifetime thereof.

The floats 401a are typically made from polyethylene. In one example embodiment, each float 401a is produced from a plastic material. This material has the advantage of being inert or at least of low reactivity in a marine environment.

Figure 2B:
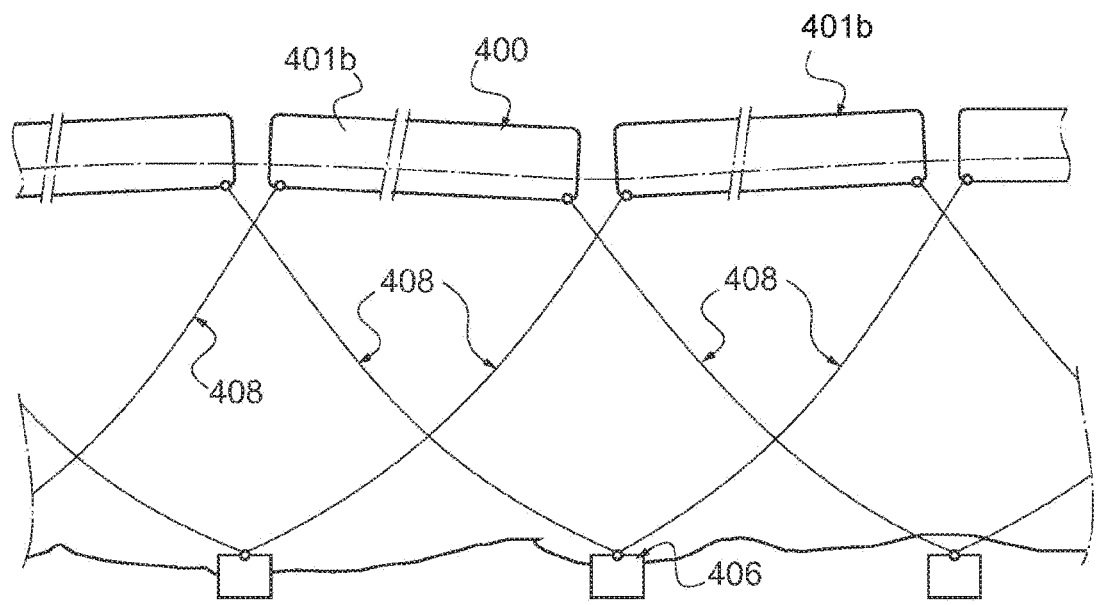
FIG. 2B is a diagrammatic representation from the side of the buoyancy means according to a second embodiment of the invention.

In a second embodiment of the buoyancy means represented in FIG. 2b, buoys 401b are held around a position of equilibrium via fastenings that are detachable or fixed to the bottom of the sea.

This embodiment has the advantage of minimizing the forces on the buoys 401b when the movements of the sea or the current become too great. In other words, the stresses both in the mechanical links and in the fluidic links are reduced.

Each buoy 401b is linked to one or more anchorage points 406 via a linking cable 408.

The linking cable 408 may typically be a metal or synthetic cable, or a chain.

The anchorage point 406 is typically a mooring anchor or an immersed mooring mass. The anchorage point 406 may be an immersed construction provided it does not require works that are as considerable as for the construction of a jetty.

The length of the linking cables 408 is sufficient to enable each buoy to be able to move with the movements of the sea around an equilibrium position.

Figure 2C:
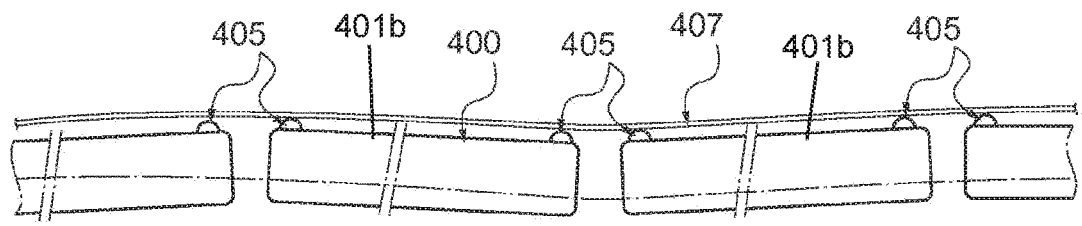
FIG. 2C is a diagrammatic representation from the side of the buoyancy means according to a third embodiment of the invention.

In a third embodiment of the buoyancy means represented in FIG. 2c, each float 401b comprises at least two linking means 405. The linking means 405 are fastened to non-immersed facing ends of neighboring floats 401b.

In this embodiment, the linking means are rings 405 of sufficient diameter to allow a linking cable 407 to pass between the buoys 401b.

Figure 3A:
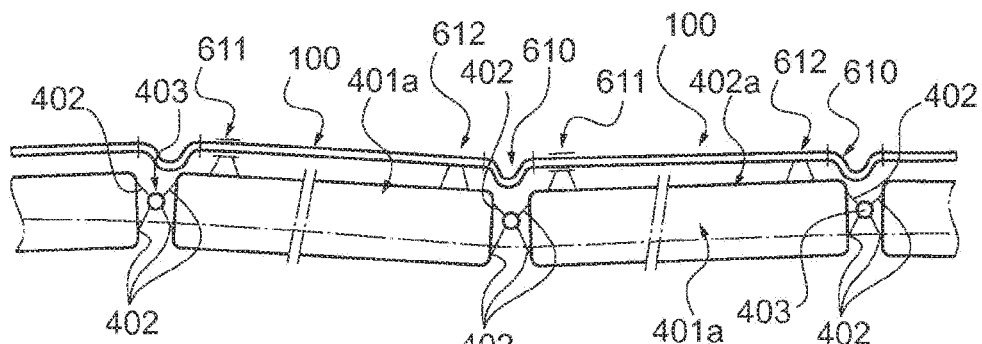
FIG. 3A is a diagrammatic representation from the side of the connection means according to an embodiment of the invention.
Figure 3B:
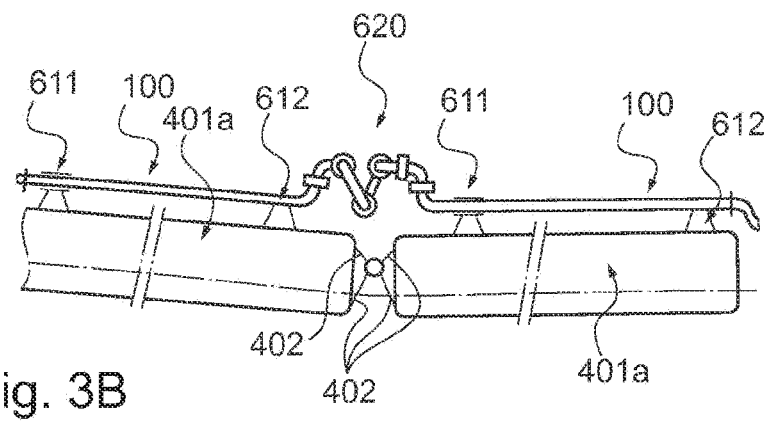
FIG. 3B is a diagrammatic representation from the side of the connection means according to a second embodiment of the invention.
Figure 3C:
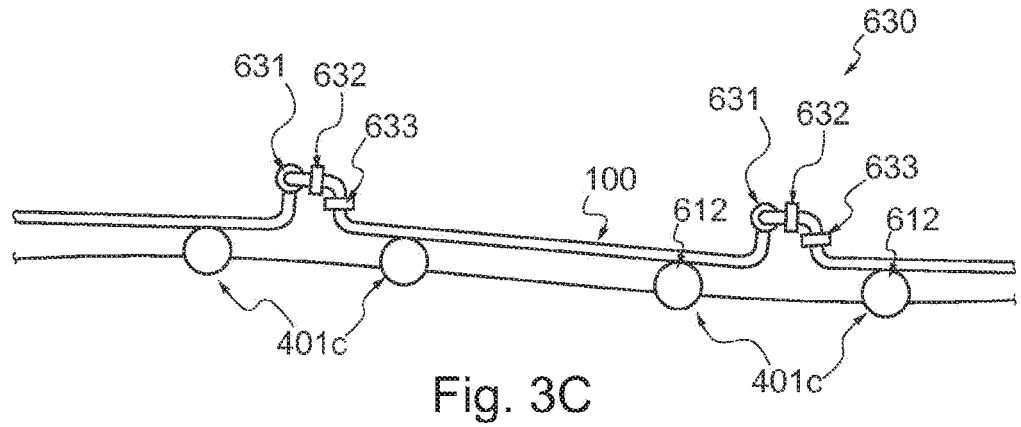
FIG. 3C is a diagrammatic representation from the side of the connection means according to a third embodiment of the invention.
Figure 3D:
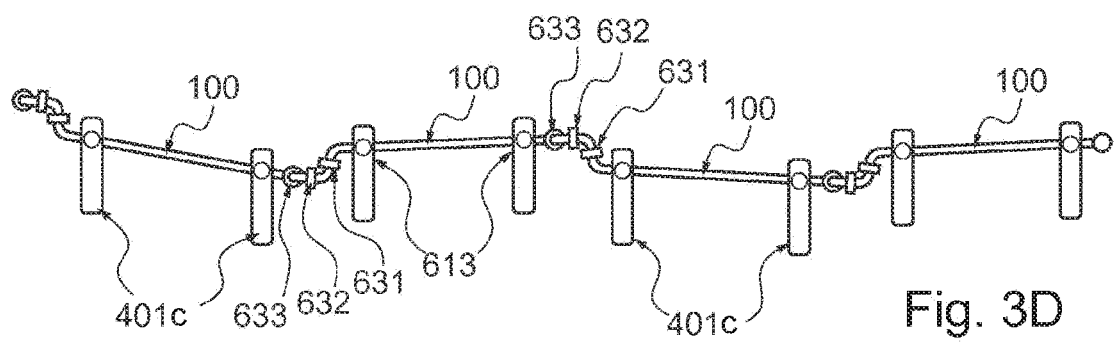
FIG. 3D is a diagrammatic representation from above of the buoyancy connection means according to a fourth embodiment of the invention.

With reference to FIGS. 3A to 3C, a pipe 100 adapted to transport cryogenic products is linked to one or more floats 401a, 401c.

In another embodiment, two or more pipes 100 may also be disposed on a same float 400. Among these pipes 100, pipes 100 are also adapted for the transport, in an opposite direction to the transport of the cryogenic product, of the natural gas vapors. These return pipes also make it possible to minimize pressure losses.

The pipe 100 is typically a rigid pipe configured to transport cryogenic products. This type of pipe 100 in practice comprises a smooth inside wall. The smooth inside walls have a low coefficient of friction. This feature makes it possible to reduce the turbulence within the moving cryogenic product.

Thus, pressure losses are reduced and the cryogenic product may be optimally transported over long distances while minimizing the pressure losses.

The pipes 100 may be made of stainless steel configured for cryogenic transport. However, the pipes 100 may very well be made of other materials suitable for cryogenic transport, such as aluminum, manganese-based alloys, nickel-based alloys, plastic materials and composite materials. The pipes 100 may be thermally insulated if necessary.

With reference to FIG. 3A, a first embodiment of the connection means is presented.

In this embodiment, each rigid pipe 100 rests on a float 401a by means of at least two linking means (611, 612) to minimize the bending forces on the rigid pipe 100.

The two linking means (611, 612) are disposed here on the upper, non-immersed surface of the float 401a. Each linking means (611, 612) is disposed here as close as possible to a fluidic connection means 610.

In this embodiment, one of the linking means is a support 611 fastened to the float and comprising a sliding-movement guide tube 611, the other linking means being a support 612 for fastening the pipe 100 to the static floater 400.

The sliding-movement guide tube 611 has a tube of sufficient diameter for the pipe 100 to be able to slide inside, in particular in case of expansion.

Still in the embodiment represented in FIG. 3A, the pipes 100 are linked to each other using a fluidic connection means.

In this embodiment, the fluidic connection means is a flexible pipe 610, suitable for transporting a cryogenic product, of short length relative to the length of the pipes 100 disposed on the floats. Each flexible pipe 610 is also of sufficient length to enable the floats 401a to move relative to each other according to the movements of the sea. The length of the flexible pipes 610 is nevertheless also chosen to be sufficiently short to avoid the flexible pipes 610 giving rise to excessive pressure losses. The links between the flexible pipes 610 and the rigid pipes 100 are of course made fluid-tight.

Each flexible pipe 610 is thus linked at each of its two ends to a rigid pipe 100.

This type of connection means is also that of the pipes 100 of FIG. 1.

In an alternative embodiment represented in FIG. 3B, the fluidic connection means comprise a set 620 of six cryogenic swivel joints linked by pipe bends.

The assembly is configured so as to enable the six degrees of freedom to be provided and is welded at each of its free ends to a bent end of an adjacent pipe 100

The mechanical connection means between two successive floats 401a are of sufficient length here for the fluidic connection means 620 between the rigid pipes 100 to move with the movements of the sea and the dimensional variations of the pipes 100 due to temperature variations.

Thus, the six degrees of freedom of these fluidic connection means 620 between the pipes 100 make it possible to reduce the stresses at their level.

It will furthermore be observed that the pipes 100 are linked to the floats 401a by linking means identical to those of FIG. 3A.

In another alternative embodiment represented in FIG. 3C, the connection means 630 only comprise three swivel joints or connectors (631-633). The assembly thus comprises the combination of a first swivel connector 631, then a pipe bend, then a second swivel connector 632 forming an angle of 90° with the first connector. The latter is complemented by a third connector 633 connected to the second by a pipe bend and forming an angle of 90° with the second. The swivel connectors of these assemblies are, here too, all cryogenic.

Thus, there are only three degrees of freedom of these fluidic connection means (3 rotations with axes that are perpendicular) and represent a connection means that is simplified compared to the connection means 620 represented in FIG. 3B.

Still in this embodiment, which may be taken in combination with other embodiments, the rigid pipes 100 are fastened to one or more floats 401c spaced apart from each other. Each float 401c is positioned near an end of a pipe 100, perpendicularly thereto. Thus, the bending forces of the pipe 100 are minimized.

Of course, one, two, three, four or more floats 401c may be fastened under the pipe 100.

Still in this embodiment, the link 612 between the pipe 100 and the float 401c is a fixed link.

In other words, no degree of freedom is permitted between the pipe 100 and the floats.

The fixed links 612 do not prevent the pipe 100 from contracting or expanding with variations in temperature. They are for example clamp collars.

Of course, other fluidic connection means, allowing at least one degree of freedom between the rigid pipes 100, may be used in this embodiment.

In another alternative embodiment represented in FIG. 3D, the connection means 631-633 correspond to the connection means presented in the embodiment of FIG. 3C.

Still in this embodiment, which may be taken in combination with other embodiments, the rigid pipes 100 are each linked to one or more floats 401c.

Each float 401c is linked to a pipe by a link 613 of vertical axis pivot type configured to enable the float to move with the movements of the sea. The floats may thus orient themselves passively in the direction of the current to minimize the hydrodynamic forces exerted on the transfer device.

In this embodiment, the pipes 100 are preferably disposed eccentrically relative to the middle of each float 401c. The position and the number of floats 401c are chosen so as to ensure the stability of the device, and to avoid interference between the floats 401c.

Figure 4A:
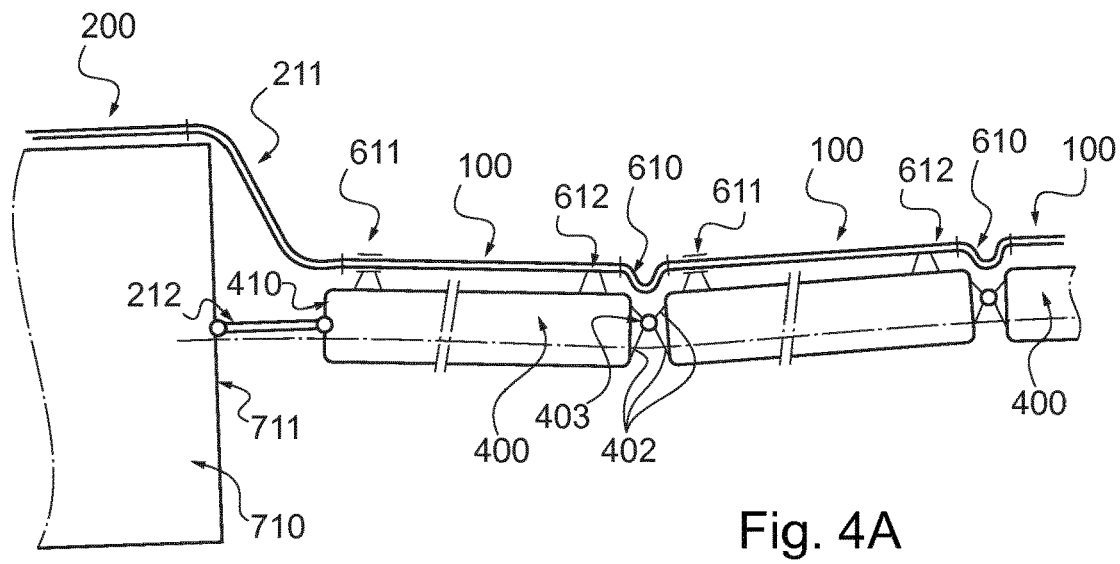
FIG. 4A is a diagrammatic representation from the side of a means for connection to a floating or fixed structure according to an embodiment of the invention.

One embodiment of the connection means for connection to the duct 200 that is disposed on the fixed or floating structure, is represented in FIG. 4A in combination here with the means represented in FIG. 3A.

In this embodiment, the duct 200 is linked to the cryogenic product transfer device via mechanical linking means 212 and fluidic linking means 211.

The fluidic link means is here a flexible pipe 211 adapted to transport cryogenic product. The flexible pipe 211 forms the fluidic link between the duct 200 disposed on the fixed structure 710, such as a quay, and an end rigid pipe 100 belonging to the cryogenic product transfer device. The flexible pipe 211 is of sufficient length not to be constantly acted upon by traction forces due to the difference in level between the duct 200 and the rigid pipe 100 belonging to the device.

In this embodiment, the mechanical link is formed by means of a rigid arm 212. The arm 212 is rigid so as to keep an average distance between the last float 400 and the duct 200 disposed on the fixed structure and enabling the indispensable vertical movements, generated in particular by the tide. The arm 212 is linked at one end to the lateral surface 711 of the fixed structure 710 and at its other end to a lateral face 410 of the last float 400 of the device. The links are typically formed by means of ball joints or pivots (2 in number here) disposed so as to enable the buoys 400 rise and fall with the tide.

Figure 4B:
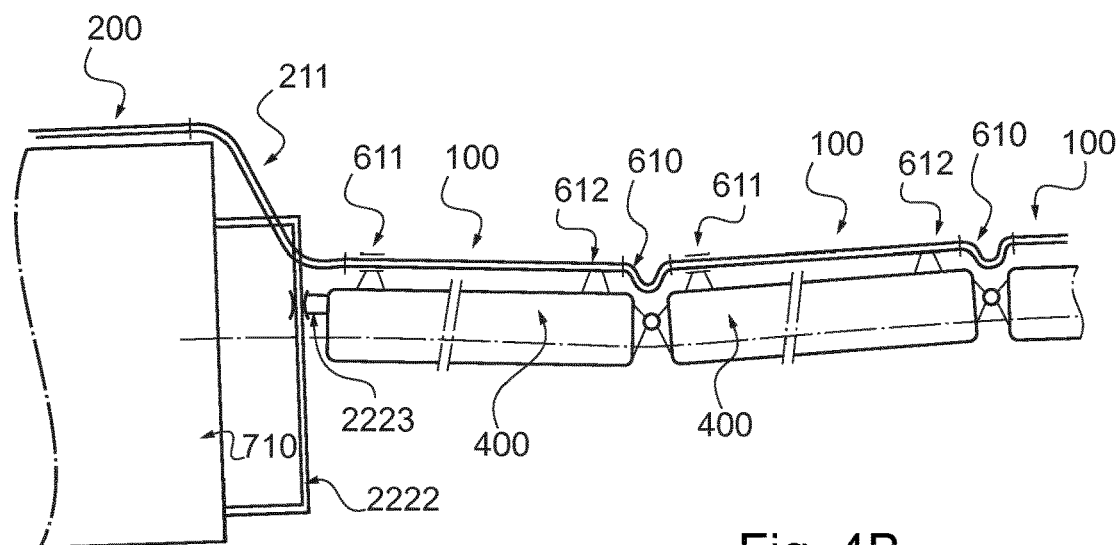
FIG. 4B is a diagrammatic representation from the side of a means for connection to a floating or fixed structure according to a second embodiment of the invention.

A second embodiment for connection of the duct 200 is represented in FIG. 4B in combination with the connection means of FIG. 3A.

In this embodiment, the fluidic linking means is a flexible pipe 211 configured to transport a cryogenic product and similar to that represented in FIG. 4A.

The mechanical linking means is formed here by means of a sliding link.

In practice, a vertical arm 2222 is fastened to the quay 710 and the last float 400 cooperates with this vertical arm 2222 by a vertical-axis sliding pivot link 2223 to enable the last float 400 to rise and fall.

As a variant, it may be a sliding link and it is also possible to envision implementing more than one link of one type or the other.

Figure 4C:
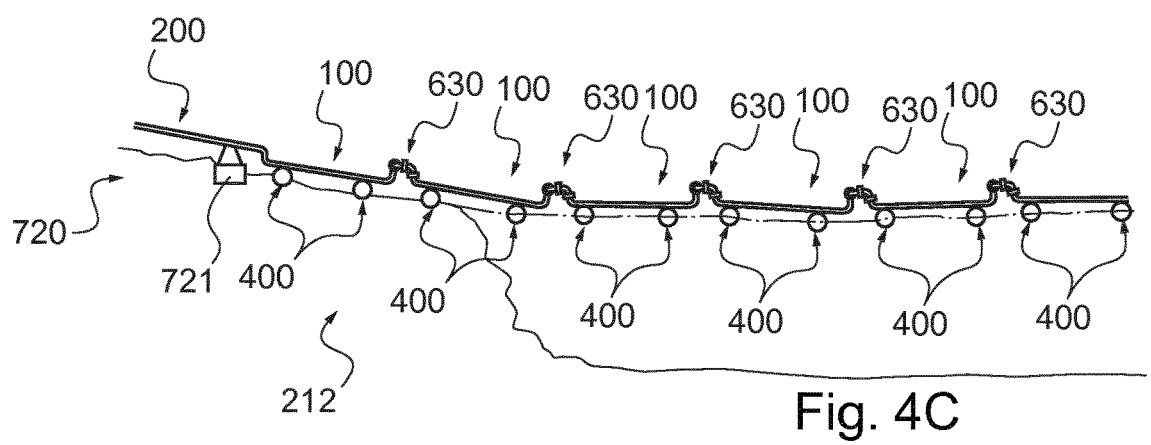
FIG. 4C is a diagrammatic representation from the side of a means for connection to a fixed structure according to a third embodiment of the invention.

A third embodiment of the duct 200 is represented in FIG. 4C in combination with the means represented in FIG. 3C.

The connection takes place here on a sloping fixed structure, such as a shore 720.

In this connection embodiment, the surface of the shore 720 has been configured to enable end floats 400 to rest on the shore and enable correspondence between the transfer device and the duct 200.

The last or several pipes may also rest on posts disposed on the shore 720, such as that bearing the reference 721 in FIG. 4C.

According to the level of the water, the floats float or rest on the shore 720.

Figure 5:
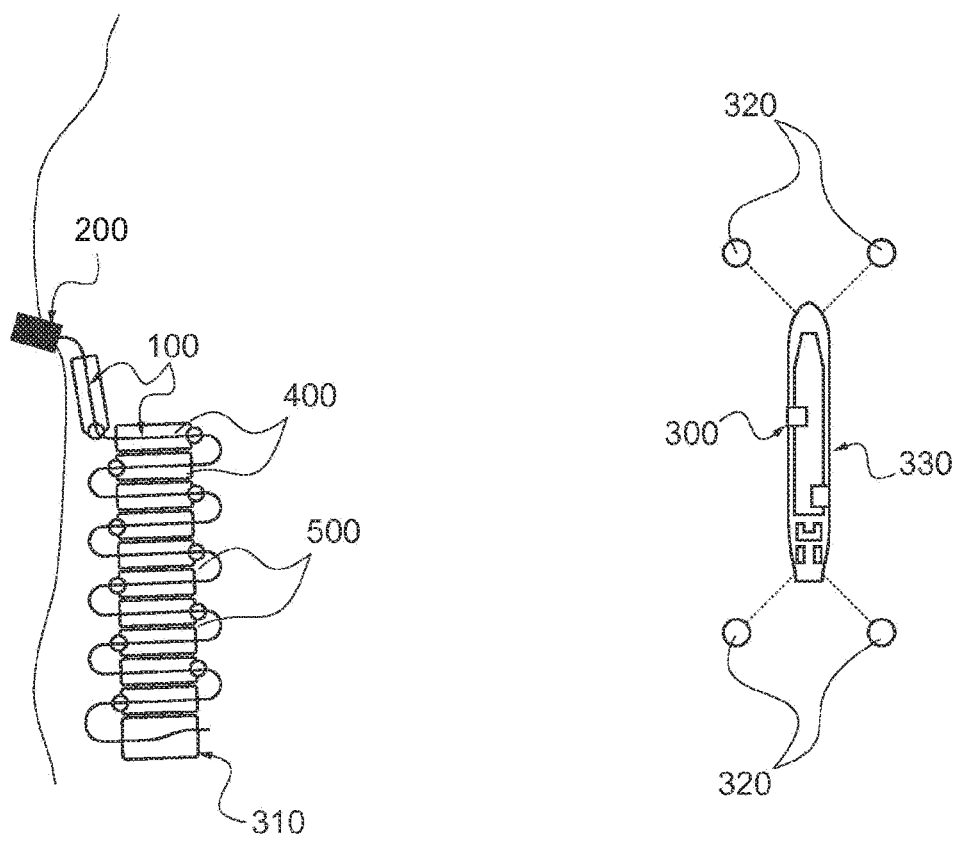
FIG. 5 is a diagrammatic representation from above of a device in folded mode in accordance with an embodiment of the invention.

With reference to FIGS. 1 and 5, a method of extension and retraction of the cryogenic product transfer device will now be described.

In FIG. 5, the device is represented in stored position.

In retraction phase, the cryogenic product interface 310 is mechanically and fluidically detached from the floating structure 330.

In a second step, the buoyancy means 400 are folded against each other. Thus, the buoyancy means 400 and the pipes 100 are substantially parallel to each other.

In a third step, the penultimate float, adjacent the duct 200, is folded through an angle of substantially 90° relative to the last buoyancy means 400 in contact with the duct 200. Thus, the cryogenic product transfer device does not encumber the expanse of water by being disposed substantially parallel to the shore or to the quay and may be extended according to needs.

As a variant, the device is, in an additional step, fluidically and mechanically disconnected from the duct 200.

In this variant, the device may be stored on land. Thus, the device does not encumber the coastline.

In extension phase, in a first step, the penultimate buoyancy means 400, adjacent the duct 200, is unfolded through an angle of substantially 90° relative to the last buoyancy means 400 in contact with the duct 200. The extension may be carried out either by means of the motor-driven cryogenic interface 310, or by means of a tugboat, or by a system of cables and winches as described above.

In a second step, the buoyancy means 400 are unfolded relative to each other. Thus, the buoyancy means 400 and the pipes 100 are substantially aligned in a longitudinal direction.

In third step, the cryogenic product interface 310 is mechanically and fluidically linked to the floating structure 330.

In practice, the fluidic connection means and, as the case may be, the linking means of the buoyancy means, must therefore enable a rotation of 180° of the pipes 100 and of the buoyancy means, while these latter must be arranged so as not to interfere with the rotation.

This is the case here with a transfer device such as that of FIG. 1. As a variant, the transfer devices with connection means by swivel joints may also be configured to achieve this folding.

Numerous other variants are possible according to circumstances, and in this connection it is to be noted that the present invention is not limited to the examples represented and described.

The invention claimed is:

1. A device for the transfer of cryogenic product from a first floating structure for storing cryogenic product to a second fixed or floating structure for storing cryogenic product, the device comprising:
a plurality of rigid pipes configured to transport the cryogenic product between a first duct linked to the first structure and a second duct linked to the second structure,
buoyancy means for carrying the pipes; and
connection means for fluidically connecting the pipes in pairs, said connection means being suitable for transporting the cryogenic product and allowing at least one degree of freedom between each pair of pipes,
wherein said buoyancy means comprises a plurality of floats linked or articulated to each other by mechanical linking means, or a plurality of buoys provided with means for anchorage to the bed of an expanse of water,
wherein the buoyancy means are linked to the pipes by means of an articulation, wherein the buoyancy means are articulated to the pipes along a vertical axis.

2. The device according to claim 1, wherein each buoyancy means comprises a pipe support which is configured to enable the pipe to slide relative to the buoyancy means and/or a pipe support which is configured to fasten the pipe to the buoyancy means.

3. The device according to claim 1, wherein the buoyancy means number one per pipe and are arranged parallel thereto or two per pipe and are arranged perpendicularly thereto.

4. The device according to claim 1, wherein at least one of the connection means comprises an assembly formed from at least three cryogenic swivel joints and tube elbows which are connected together so as to connect the pipes with at least three degrees of rotary freedom.

5. The device according to claim 4, wherein the number of cryogenic swivel joints is six to provide six degrees of freedom between each pair of pipes.

6. The device according to claim 1, wherein at least one of the connection means is a flexible pipe configured to cooperate with a free end of a first rigid pipe and a free end of a second, adjacent rigid pipe, said flexible pipe is being configured to transport a cryogenic product.

7. A device for the transfer of cryogenic product from a first floating structure for storing cryogenic product to a second fixed or floating structure for storing cryogenic product, the device comprising:
a plurality of rigid pipes configured to transport the cryogenic product between a first duct linked to the first structure and a second duct linked to the second structure,
buoyancy means for carrying the pipes; and
connection means for fluidically connecting the pipes in pairs, said connection means being suitable for transporting the cryogenic product and allowing at least one degree of freedom between each pair of pipes,
wherein the device is configured to be linked to the second structure by a mechanical linking means, comprising one or more levers articulated to the device and to the second structure by means of pivot links or a sliding link.

8. The device according to claim 1, wherein the device comprises a flexible pipe configured to transport the cryogenic product and to provide a link between an endmost rigid pipe and the second duct linked to the second structure.

9. A device for the transfer of cryogenic product from a first floating structure for storing cryogenic product to a second fixed or floating structure for storing cryogenic product, the device comprising:
a plurality of rigid pipes configured to transport the cryogenic product between a first duct linked to the first structure and a second duct linked to the second structure,
buoyancy means for carrying the pipes; and
connection means for fluidically connecting the pipes in pairs, said connection means being suitable for transporting the cryogenic product and allowing at least one degree of freedom between each pair of pipes,
wherein the device is configured to be linked to the second duct of the second structure by both mechanical linking means and fluidic linking means.

10. The device according to claim 1, further comprising a cryogenic interface comprising cryogenic piping configured to provide a fluidic link between an endmost pipe and a target duct on the first structure which is situated at a higher level than the rigid pipes.

11. The device according to claim 2, A device for the transfer of cryogenic product from a first floating structure for storing cryogenic product to a second fixed or floating structure for storing cryogenic product, the device comprising:
a plurality of rigid pipes configured to transport the cryogenic product between a first duct linked to the first structure and a second duct linked to the second structure,
buoyancy means for carrying the pipes; and
connection means for fluidically connecting the pipes in pairs, said connection means being suitable for transporting the cryogenic product and allowing at least one degree of freedom between each pair of pipes,
wherein said buoyancy means comprises a plurality of floats linked or articulated to each other by mechanical linking means, or a plurality of buoys provided with means for anchorage to the bed of an expanse of water,
wherein the connection means is configured to enable a rotation of the pipes through 180° around a substantially vertical rotational axis so as to be able to dispose the pipes and the buoyancy means parallel to each other.

12. The device according to claim 11, wherein the mechanical linking means is configured to enable a rotation of the buoys through 180° around a substantially vertical rotational axis so as to be able to dispose the pipes and the buoyancy means parallel to each other.

13. A method of retracting a device according to claim 11 or 12, the device comprising at least three fluidic transport units, each transport unit comprising a buoyancy means bearing a corresponding pipe, the method comprising the following steps:
folding a first transport unit onto a second, successive transport unit through a rotation of at least 180° around a rotational axis;
folding said second transport unit onto a third transport unit through a rotation of at least 180° around a rotational axis; and optionally rotating the transport units folded onto each other so as to orientate the assembly so formed in a predetermined direction.

\* \* \* \* \*